(12) United States Patent
Nomura et al.

(10) Patent No.: US 7,947,791 B2
(45) Date of Patent: May 24, 2011

(54) FLUORINATED POLYMER

(75) Inventors: Jumpei Nomura, Chiyoda-ku (JP);
Toshikazu Yoneda, Chiyoda-ku (JP);
Mitsuru Seki, Chiyoda-ku (JP); Hiroki Kamiya, Chiyoda-ku (JP); Hiroshi Funaki, Chiyoda-ku (JP); Takehiro Kose, Chiyoda-ku (JP)

(73) Assignee: Asahi Glass Company, Limited, Tokyo (JP)

( * ) Notice: Subject to any disclaimer, the term of this patent is extended or adjusted under 35 U.S.C. 154(b) by 114 days.

(21) Appl. No.: 12/407,025

(22) Filed: Mar. 19, 2009

(65) Prior Publication Data
US 2009/0186986 A1    Jul. 23, 2009

Related U.S. Application Data

(63) Continuation of application No. PCT/JP2007/068718, filed on Sep. 26, 2007.

(30) Foreign Application Priority Data

Sep. 28, 2006 (JP) .................. 2006-265742
Apr. 6, 2007 (JP) .................. 2007-101170

(51) Int. Cl.
*C08F 114/18* (2006.01)

(52) U.S. Cl. ........ 526/242; 526/243; 526/244; 526/245; 526/246; 526/247; 526/248; 526/249; 526/250; 526/251; 526/252; 526/253; 526/254; 526/255

(58) Field of Classification Search .................. 526/242, 526/243, 244, 245, 246, 247, 248, 249, 250, 526/251, 252, 253, 254, 255
See application file for complete search history.

(56) References Cited

U.S. PATENT DOCUMENTS

| 3,380,971 | A | * | 4/1968 | Chalmers et al. ............. 526/249 |
| 3,451,978 | A | | 6/1969 | Chalmers et al. |
| 3,859,330 | A | | 1/1975 | Proskow |
| 4,129,617 | A | | 12/1978 | Machi et al. |
| 4,853,448 | A | * | 8/1989 | Muller et al. .................. 526/254 |
| 5,198,498 | A | | 3/1993 | Valet et al. |
| 5,859,144 | A | * | 1/1999 | Saito et al. ................. 525/326.2 |
| 5,959,037 | A | | 9/1999 | Saito et al. |
| 6,627,383 | B2 | * | 9/2003 | Lee et al. .................... 430/270.1 |
| 6,686,123 | B2 | * | 2/2004 | Lee et al. .................... 430/270.1 |
| 2005/0075461 | A1 | | 4/2005 | Morimoto et al. |
| 2007/0123672 | A1 | | 5/2007 | Funaki et al. |
| 2007/0167581 | A1 | | 7/2007 | Nomura et al. |

FOREIGN PATENT DOCUMENTS

| GB | 1 548 990 | 7/1979 |
| JP | 62-207347 | 9/1987 |
| JP | 06-306242 | 11/1994 |
| JP | 06-306244 | 11/1994 |
| JP | 07-286083 | 10/1995 |
| JP | 09-67499 | 11/1997 |
| JP | 10-158335 | 6/1998 |
| JP | 2000-63605 | 2/2000 |
| JP | 2000-281856 | 10/2000 |
| JP | 2004-043736 | 2/2004 |
| JP | 2004-175857 | 6/2004 |
| JP | 2005-298690 | 10/2005 |
| JP | 2006-163066 | 6/2006 |
| JP | 2006-276759 | 10/2006 |

OTHER PUBLICATIONS

Database, WPI Week 198312, Thomson Scientific, 1983-28411K, XP002597204, 2 pages (abstract).
Database, WPI Week 197801, Thomson Scientific, 1978-01123A, XP002597205, 1 page (abstract).

* cited by examiner

*Primary Examiner* — Bernard Lipman
(74) *Attorney, Agent, or Firm* — Oblon, Spivak, McClelland, Maier & Neustadt, L.L.P.

(57) ABSTRACT

The present invention provides a fluorinated polymer excellent in the crosslinking reactivity, crosslinked rubber physical properties and chemical resistance, and its crosslinked rubber. A fluorinated polymer comprising repeating units (a) based on at least one monomer selected from the group consisting of ethylenic unsaturated compounds each having a hydroxyphenyl group, repeating units (b) based on at least one fluoromonomer selected from the group consisting of tetrafluoroethylene, hexafluoropropylene, vinylidene fluoride, 3,3,3-trifluoropropene, 1,3,3,3-tetrafluoropropene, 1,1,2-trifluoroethylene, vinyl fluoride, 1,2-difluoroethylene and $CF_2=CF-O-R^f$ (wherein $R^f$ is a $C_{1-8}$ saturated perfluoroalkyl group or a perfluoro(alkoxyalkyl) group) and, if necessary, repeating units (c) based on at least one hydrocarbon monomer selected from the group consisting of ethylene, propylene and $CH_2=CH-O-R^1$.

13 Claims, No Drawings

FLUORINATED POLYMER

TECHNICAL FIELD

The present invention relates to a fluorinated polymer.

BACKGROUND ART

As fluororubbers obtained from fluorinated polymers, for example, a fluororesin such as polytetrafluoroethylene, a tetrafluoroethylene/hexafluoropropylene copolymer or a tetrafluoroethylene/ethylene copolymer, a vinylidene fluoride/hexafluoropropylene copolymer, a tetrafluoroethylene/propylene copolymer and a tetrafluoroethylene/perfluoro (alkyl vinyl ether) copolymer are known.

As these fluororubbers are excellent in heat resistance and chemical resistance, they are used in a sever condition where normal materials are not durable. However, among them, a vulcanizate of a copolymer having many repeating units based on vinylidene fluoride, such as a fluororubber obtained by copolymerizing vinylidene fluoride and hexafluoropropylene, so-called FKM, or a fluororubber obtained by copolymerizing vinylidene fluoride, tetrafluoroethylene and hexafluoropropylene, has a problem such that its durability against a high heat resistance engine oil having e.g. an amine type antiaging agent added, is insufficient, because its resistance against a base is not enough and its degree of degradation caused by the reaction of an amine type additive with the moiety of repeating units based on vinylidene fluoride is high (Patent Document 1).

On the other hand, a fluororubber obtained by copolymerizing tetrafluoroethylene and propylene, so-called FEPM, is excellent in resistance against a base, as compared with FKM. Further, it is known that the fluororubber is excellent in durability also against a high heat resistance engine oil comprising, for example, an amine type additive (Patent Document 2). However, when FEPM is crosslinked by a polyol crosslinking recipe using a polyhydroxy compound and a crosslinking accelerator in combination, the crosslinking reactivity is low as compared with FMK, and various crosslinking recipe have been proposed to speed up the crosslinking (Patent Document 3).

Patent Document 1: JP-A-6-306244
Patent Document 2: JP-A-6-306242
Patent Document 3: JP-A-12-281856

DISCLOSURE OF THE INVENTION

Object to be Accomplished by the Invention

It is an object of the present invention to provide a fluorinated polymer excellent in the crosslinking reactivity and the crosslinked rubber physical properties, and its crosslinked rubber.

Means to Accomplish the Object

The present invention is to accomplish the above object and provides the following.
(1) A fluorinated polymer comprising repeating units based on an ethylenic unsaturated compound having a hydroxyphenyl group.
(2) A fluorinated polymer comprising repeating units (a) based on at least one monomer selected from the group consisting of compounds represented by the following formulae [I], [II], [III], [IV], [V] and [VI], as the ethylenic unsaturated compounds each having a hydroxyphenyl group:

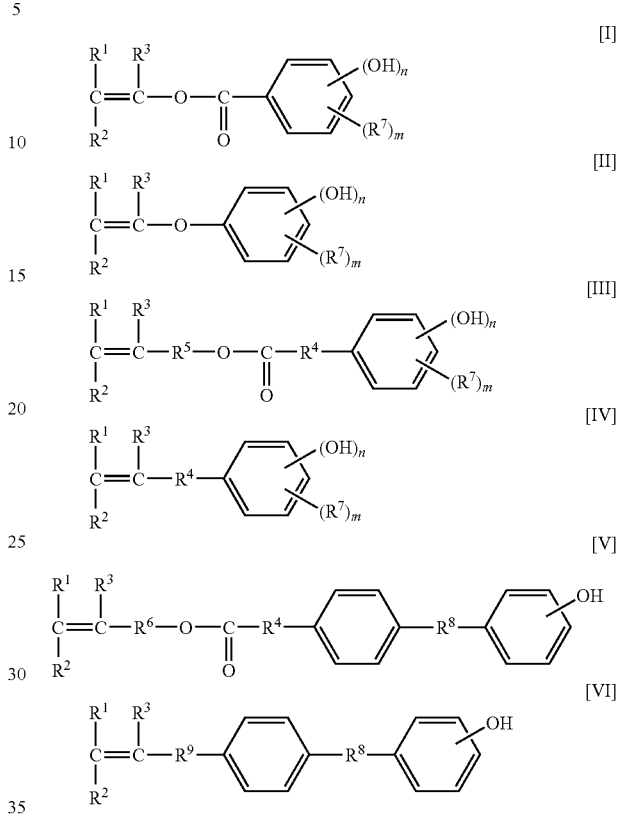

(wherein each of $R^1$ and $R^2$ which are independent of each other, is a hydrogen atom, a fluorine atom, a $C_{1-10}$ alkyl group or a $C_{1-10}$ alkoxyalkyl group containing an etheric oxygen atom, $R^3$ is a hydrogen atom, a fluorine atom or a methyl group, each of $R^4$ and $R^6$ is a single bond or a $C_{1-10}$ alkylene group which may contain an etheric oxygen atom, $R^5$ is a $C_{1-10}$ alkyl group which may contain an etheric oxygen atom, $R^7$ is a $C_{1-5}$ alkyl group, $R^9$ is a single bond, an oxygen atom or a $C_{1-10}$ alkylene group which may contain an etheric oxygen atom, and $R^8$ is one of groups represented by the formula (1):

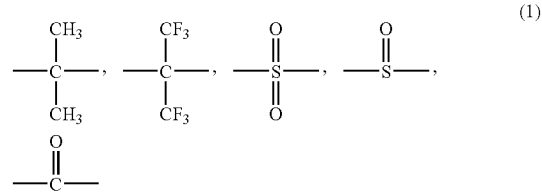

wherein n is an integer of from 1 to 5, and m is 0 or an integer of from 1 to 4, provided that n+m≦5), and having a Mooney viscosity (100° C.) of 10 to 200.
(3) The fluorinated polymer according to the above (2), which comprises the above repeating units (a), repeating units (b) based on at least one fluoromonomer selected from the group consisting of tetrafluoroethylene, hexafluoropropylene, vinylidene fluoride, 3,3,3-trifluoropropene, 1,3,3,3-tetrafluoropropene, 1,1,2-trifluoroethylene, vinyl fluoride, 1,2-difluoroethylene and $CF_2=CF-O-R^f$ (wherein $R^f$ is a $C_{1-8}$ saturated perfluoroalkyl group or a perfluoro(alkoxyalkyl) group) and, if necessary, repeating units (c) based on at least one hydrocarbon monomer selected from the group consisting of ethylene, propylene and $CH_2=CH-O-R^1$ (wherein $R^1$ is a $C_{1-8}$ saturated alkyl group or an alkoxyalkyl group), wherein (a)/((b)+(c))= 0.0001 to 0.1 (molar ratio).

(4) The fluorinated polymer according to the above (3), wherein the above repeating units (b) are based on at least one fluoromonomer selected from the group consisting of tetrafluoroethylene, vinylidene fluoride, 3,3,3-trifluoropropene, 1,3,3,3-tetrafluoropropene, 1,1,2-trifluoroethylene, vinyl fluoride and 1,2-difluoroethylene, and the above repeating units (c) are based on propylene.

(5) The fluorinated polymer according to the above (3), wherein the above repeating units (b) are based on at least one fluoromonomer selected from the group consisting of tetrafluoroethylene, hexafluoropropylene, vinylidene fluoride, 3,3,3-trifluoropropene, 1,3,3,3-tetrafluoropropene, 1,1,2-trifluoroethylene, vinyl fluoride and 1,2-difluoroethylene.

(6) The fluorinated polymer according to the above (3), wherein the above repeating units (b) are based on at least one fluoromonomer selected from the group consisting of tetrafluoroethylene and $CF_2=CF-O-R^f$ (wherein $R^f$ is a $C_{1-8}$ saturated perfluoroalkyl group or a perfluoro(alkoxyalkyl) group).

(7) The fluorinated polymer according to the above (3), wherein in the above formulae [I] and [III], each of $R^1$ and $R^2$ is a hydrogen atom, R is a hydrogen atom or a methyl group, and n is 1.

(8) The fluorinated polymer according to the above (3), wherein the above repeating units (a) are based on vinyl p-hydroxybenzoate, the above-repeating units (b) are based on tetrafluoroethylene, the above repeating units (c) are based on propylene, wherein (c)/(b)=40/60 to 60/40 (molar ratio) and (a)/((b)+(c))=0.0001 to 0.05 (molar ratio).

(9) A vulcanizable fluorinated polymer composition obtainable by incorporating, as a crosslinking agent, a polymer comprising repeating units based on at least one monomer selected from the group consisting of vinylidene fluoride, tetrafluoropropylene, 1,3,3,3-tetrafluoropropene, 1,1,2-trifluoroethylene, vinyl fluoride and 1,2-difluoroethylene to the fluorinated polymer as defined in any one of the above (1) to (8).

(10) A vulcanizable fluorinated polymer composition obtainable by incorporating, as a crosslinking agent, a fluorinated compound represented by the formula $(CXY=CZO-)_kQ$ (wherein each of X, Y and Z which are independent of one another, is a hydrogen atom or a fluorine atom, and at least one among X, Y and Z is a fluorine atom, k is an integer of from 2 to 10, Q is a bonding group and represents an alkylene group, an alkylene group which may contain an oxygen atom, an aromatic ring or a polycyclic aromatic ring, and Q may contain a fluorine atom) to the fluorinated polymer as defined in any one of the above (1) to (8).

(11) A vulcanizable fluorinated polymer composition obtainable by incorporating a quaternary onium salt and an acid scavenger to the fluorinated polymer as defined in any one of the above (1) to (10).

(12) A crosslinked rubber obtainable by crosslinking the fluorinated polymer or the fluorinated polymer composition as defined in any one of the above (1) to (11).

(13) A process for producing the fluorinated polymer as defined in any one of the above (3) to (7), characterized by conducting radical copolymerization of an ethylenic unsaturated compound having a hydroxyphenyl group, at least one fluoromonomer selected from the group consisting of tetrafluoroethylene, hexafluoropropylene, vinylidene fluoride, 3,3,3-trifluoropropene, 1,3,3,3-tetrafluoropropene, 1,1,2-trifluoroethylene, vinyl fluoride, 1,2-difluoroethylene and $CF_2=CF-O-R^f$ (wherein $R^f$ is a $C_{1-8}$ saturated perfluoroalkyl group or a perfluoro(alkoxyalkyl) group), and if necessary, at least one hydrocarbon monomer selected from the group consisting of ethylene, propylene and $CH_2=CH-O-R^1$ (wherein $R^1$ is a $C_{1-8}$ saturated alkyl group or an alkoxyalkyl group) in the presence of a radical polymerization initiator.

Effects of the Invention

The fluorinated polymer of the present invention has rubber elasticity and is a fluororubber excellent in crosslinking reactivity, and the crosslinked rubber obtained by crosslinking the fluorinated polymer is excellent in crosslinked rubber physical properties and in engine oil resistance, heat resistance, chemical resistance, weather resistance, etc.

BEST MODE FOR CARRYING OUT THE INVENTION

The fluorinated polymer of the present invention comprises repeating units based on an ethylenic unsaturated compound having a hydroxyphenyl group.

With respect to fluoromonomers, tetrafluoroethylene will be referred to as TFE, hexafluoropropylene as HFP, vinylidene fluoride as VdF, 3,3,3-trifluoropropene as TFP, 1,3,3,3-tetrafluoropropene as TeFP, 1,1,2-trifluoroethylene as TrFE, vinyl fluoride as VF, 1,2-difluoroethylene as DiFE, $CF_2=CF-O-R^f$ as PAVE, perfluoro(methyl vinyl ether) as PMVE and perfluoro(propyl vinyl ether) as PPVE.

Preferred is a fluorinated polymer comprising repeating units (a) based on at least one monomer as the ethylenic unsaturated compound having a hydroxyphenyl group, selected from the group consisting of the compounds represented by the above formulae [I], [II], [III], [IV], [V] and [VI] (wherein each of $R^1$ and $R^2$ which are independent of each other, is a hydrogen atom, a fluorine atom, a $C_{1-10}$-alkyl group or a $C_{1-10}$ alkoxyalkyl group containing an etheric oxygen atom, $R^3$ is a hydrogen atom, a fluorine atom or a methyl group, each of $R^4$ and $R^6$ is a single bond or a $C_{1-10}$ alkylene group which may contain an etheric oxygen atom, $R^5$ is a $C_{1-10}$ alkyl group which may contain an etheric oxygen atom, $R^7$ is a $C_{1-5}$ alkyl group, $R^9$ is a single bond, an oxygen atom or a $C_{1-10}$ alkylene group which may contain an etheric oxygen atom, and $R^8$ is one of groups represented by the formula (1):

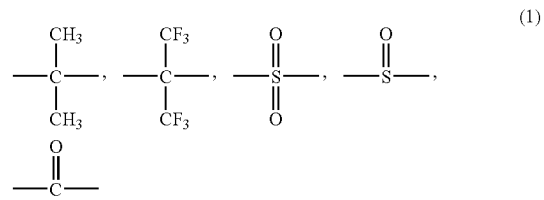

wherein n is an integer of from 1 to 5, and m is 0 or an integer of from 1 to 4, provided that $n+m \leq 5$). The fluorinated polymer of the present invention is preferably one which comprises the above repeating units (a), repeating units (b) based on at least one fluoromonomer selected from the group consisting of TFE, HFP, VdF, TFP, TeFP, TrFE, VF, DiFE and PAVE and, if necessary, repeating units (c) based on at least one hydrocarbon monomer selected from the group consisting of ethylene, propylene and $CH_2$=CH—O—$R^1$ (wherein $R^1$ is a $C_{1-8}$ saturated alkyl group or an alkoxyalkyl group), wherein (a)/((b)+(c))=0.0001 to 0.1 (molar ratio).

In the fluorinated polymer of the present invention, (c)/(b)=1/99 to 70/30 (molar ratio) is preferred and 60/40 to 40/60 (molar ratio) is more preferred. Within such a range, the fluorinated polymer will be excellent in the crosslinked rubber physical properties, and the heat resistance, the chemical resistance and the low-temperature characteristics will be good. Further, as the above hydrocarbon monomer, ethylene (hereinafter represented by E) and propylene (hereinafter represented by P) are preferred, and P is the most preferred.

The fluorinated polymer may, for example, be a TFE/P copolymer, a TFE/P/VdF copolymer, a VdF/HFP copolymer, a TFE/VdF/HFP copolymer, a TFE/PAVE copolymer, a TFE/PMVE copolymer, a TFE/P/TFP copolymer, a TFE/P/VdF/TFP copolymer, a VdF/HFP/TFP copolymer, a TFE/VdF/HFP/TFP copolymer, a TFE/PAVE copolymer, a TFE/PMVE copolymer, a TFE/PPVE copolymer, a TFE/PMVE/PPVE copolymer, a VdF/PAVE copolymer, an E/PAVE copolymer, an E/HFP copolymer, a TFE/P/TeFP copolymer, a TFE/P/TrFE copolymer, a TFE/P/VF copolymer or a TFE/P/DiFE copolymer. Preferred is, for example, a TFE/P copolymer, a TFE/P/VdF copolymer, a VdF/HFP copolymer, a TFE/VdF/HFP copolymer, a TFE/P/TFP copolymer, a TFE/PPVE copolymer, a TFE/PMVE copolymer or a TFE/PMVE/PPVE copolymer.

It is preferred that the fluorinated polymer has the following copolymer composition. When the copolymer composition is in the following range, the crosslinked rubber will be excellent in the crosslinked rubber physical properties, and the heat resistance, the chemical resistance and the low-temperature characteristics will be good.

In a TFE/P copolymer, repeating units based on TFE/repeating units based on P=40/60 to 60/40 (molar ratio), in a TFE/P/VdF copolymer, repeating units based on TFE/repeating units based on P/repeating units based on VdF=30 to 60/60 to 20/0.05 to 40 (molar ratio), in a VdF/HFP copolymer, repeating units based on VdF/repeating units based on HFP=1/99 to 95/5 (molar ratio), in a TFE/VdF/HFP copolymer, repeating units based on TFE/repeating units based on VdF/repeating units based on HFP=20 to 40/1 to 40/20 to 40 (molar ratio), in a TFE/PAVE copolymer, repeating units based on TFE/repeating units based on PMVE=40/60 to 70/30 (molar ratio), in a TFE/PMVE copolymer, repeating units based on TFE/repeating units based on PMVE=40/60 to 70/30 (molar ratio), in a TFE/PPVE copolymer, repeating units based on TFE/repeating units based on PPVE=40/60 to 70/30 (molar ratio), in a TFE/PMVE/PPVE copolymer, repeating units based on TFE/repeating units based on PAVE/repeating units based on PPVE=40 to 70/3 to 57/3 to 57 (molar ratio), in a VdF/PAVE copolymer, repeating units based on VdF/repeating units based on PAVE=3/97 to 95/5 (molar ratio), in an E/PAVE copolymer, repeating units based on E/repeating units based on PAVE=40/60 to 60/40 (molar ratio), in an E/HFP copolymer, repeating units based on E/repeating units based on HFP=40/60 to 60/40 (molar ratio), in a TFE/P/TFP copolymer, repeating units based on TFE/repeating units based on P/repeating units based on TFP=40 to 60/60 to 40/0.05 to 20 (molar ratio), in a TFE/P/VdF/TFP copolymer, repeating units based on TFE/repeating units based on P/repeating units based on VdF/repeating units based on TFP=30 to 60/60 to 20/0.05 to 40/0.05 to 20 (molar ratio), in a VdF/HFP/TFP copolymer, repeating units based on VdF/repeating units based on HFP/repeating units based on TFP=1 to 95/99 to 5/0.05 to 20 (molar ratio), in a TFE/VdF/HFP/TFP copolymer, repeating units based on TFE/repeating units based on VdF/repeating units based on HFP/repeating units based on TFP=30 to 60/0.05 to 40/60 to 20/0.05 to 20 (molar ratio), in a TFE/P/TeFP copolymer, repeating units based on TFE/repeating units based on P/repeating units based on TeFP=30 to 60/60 to 20/0.05 to 40 (molar ratio), in a TFE/P/TrFE copolymer, repeating units based on TFE/repeating units based on P/repeating units based on TeFE=30 to 60/60 to 20/0.05 to 40 (molar ratio), in a TFE/P/VF copolymer, repealing units based on TFE/repeating units based on P/repeating units based on VF=30 to 60/60 to 20/0.05 to 40 (molar ratio), and in a TFE/P/DiFE copolymer, repeating units based on TFE/repeating units based on P/repeating units based on DiFE=30 to 60/60 to 20/0.05 to 40 (molar ratio).

In the present invention, the content of repeating units (a) based on at least one monomer selected from the group consisting of compounds represented by the formulae [I], [II], [III], [IV], [V] and [VI]
(wherein each of $R^1$ and $R^2$ which are independent of each other, is a hydrogen atom, a fluorine atom, a $C_{1-10}$ alkyl group or a $C_{1-10}$ alkoxyalkyl group containing an etheric oxygen atom, $R^3$ is a hydrogen atom, a fluorine atom or a methyl group, each of $R^4$ and $R^6$ is a single bond or a $C_{1-10}$ alkylene group which may contain an etheric oxygen atom, $R^5$ is a $C_{1-20}$ alkyl group which may contain an etheric oxygen atom, $R^7$ is a $C_{1-5}$ alkyl group, $R^9$ is a single bond, an oxygen atom or a $C_{1-10}$ alkylene group which may contain an etheric oxygen atom, and $R^8$ is one of groups represented by the formula (1):

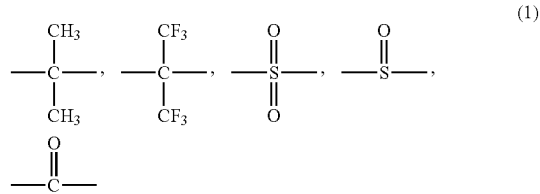

wherein n is an integer of from 1 to 5, and m is 0 or an integer of from 1 to 4, provided that n+m≦5), is (a)/((b)+(c))=0.0001 to 0.1 (molar ratio), preferably (a)/((b)+(c))=0.0001 to 0.05 (molar ratio), more preferably (a)/((b)+(c))=0.0005 to 0.05 (molar ratio). Within such a range, the fluorinated polymer will be excellent in crosslinking reactivity, and the crosslinked rubber obtained will be excellent in crosslinked rubber physical properties such as tensile strength, chemical resistance, heat resistance and compression set characteristics.

With respect to the ethylenic unsaturated compound having a hydroxyphenyl group, represented by the formulae [I], [II], [III], [IV], [V] and [VI], it is preferred that each of $R^1$ and $R^2$ is a hydrogen atom, $R^3$ is a hydrogen atom or a methyl group, and n is 1 to 2, and it is more preferred that each of $R^1$ and $R^2$ is a hydrogen atom, $R^3$ is a hydrogen atom or a methyl group, and n is 1. Further more preferred is a vinyl hydroxybenzoate of the formula [I] wherein each of $R^1$, $R^2$ and $R^3$ is a hydrogen is atom, and n is 1, and a hydroxyphenyl vinyl ether of the formula [II] wherein each of $R^1$, $R^2$ and $R^3$ is a hydrogen atom and n is 1. The vinyl p-hydroxybenzoate is the most preferred. It is possible to use only one of the ethylenic unsaturated compounds having hydroxyphenyl groups, or two or more of them in combination.

The fluorinated polymer of the present invention is crosslinkable even without having a reactive functional group such as iodine or an unsaturated bond.

The Mooney viscosity of the fluorinated polymer of the present invention is preferably from 10 to 200, more preferably from 20 to 150. The Mooney viscosity is an index for the molecular weight. When it is large, it means that the molecular weight is high, and when it is small, it means that the molecular weight is low. Within such a range, the molding processability and the crosslinked rubber physical properties of the fluorinated polymer will be good. The Mooney viscosity is a value measured in accordance with JIS K6300, by using a large rotor having a diameter of 38.1 mm and a thickness of 5.54 mm, at a temperature of 100° C., by setting a preheating time to be 1 minute, and a rotor rotating time to be 4 minutes.

The process for producing the fluorinated polymer of the present invention may, for example, be emulsion polymerization, solution polymerization, suspension polymerization or bulk polymerization. Further, for the initiation reaction, it is possible to use a radical polymerization initiator, a redox polymerization initiator, heat or radioactive ray, etc. Preferred is emulsion polymerization, because it is excellent in the adjustment of the molecular weight and copolymer composition, and the productivity.

The process for producing the fluorinated polymer of the present invention is characterized by conducting radical copolymerization of the ethylenic unsaturated compound having a hydroxyphenyl group, the fluoromonomer and, if necessary, the hydrocarbon monomer in the presence of a radical polymerization initiator. Further, it is preferred to conduct the radical copolymerization in the presence of a chain transfer agent. Furthermore, it is more preferred that the radical copolymerization is emulsion polymerization in the presence of an aqueous medium and an emulsifier.

It is preferred that the aqueous medium is water or water containing a water-soluble organic solvent. The water-soluble organic solvent may, for example, be tert-butanol, propylene glycol, dipropylene glycol, dipropylene glycol monomethyl (ether or tripropylene glycol. Preferred is tert-butanol, propylene glycol, dipropylene glycol or dipropylene glycol monomethyl ether. When the aqueous medium contains a water-soluble organic solvent, the content is preferably from 1 to 50 parts by mass, more preferably from 3 to 20 parts by mass, based on 100 parts by mass of water.

It is preferred that the emulsifier is an ionic emulsifier excellent in the mechanical and chemical stability of the latex, and an anionic emulsifier is more preferred. The anionic emulsifier is preferably e.g. a hydrocarbon type emulsifier such as sodium lauryl sulfate or sodium dodecylbenzene sulfonate, a fluorinated alkyl carboxylate such as ammonium perfluorooctanoate or ammonium perfluorohexanoate, a fluorinated emulsifier represented by the formula $F(CF_2)_nO(CF(X)CF_2O)_mCF(X)COOA$ (wherein X is a fluorine atom or a $C_{1-3}$ perfluoroalkyl group, A is a hydrogen atom, an alkali metal or $NH_4$, n is an integer of from 1 to 10, and m is 0 or an integer of from 1 to 3.).

The fluorinated emulsifier represented by the formula $F(CF_2)_nO(CF(X)CF_2O)_mCF(X)COOA$ may, for example, be $F(CF_2)_2OCF_2CF_2OCF_2COONH_4$, $F(CF_2)_3O(CF(CF_3)CF_2O)_2CF(CF_3)COONH_4$, $F(CF_2)_3OCF_2CF_2OCF_2COONH_4$, $F(CF_2)_3O(CF_2CF_2O)_2CF_2COONH_4$, $F(CF_2)_4OCF_2CF_2OCF_2COONH_4$, $F(CF_2)_4O(CF_2CF_2O)_2CF_2COONH_4$, $F(CF_2)_2OCF(CF_3)CF_2OCF(CF_3)COONH_4$, $F(CF_2)_3OCF_2CF_2OCF_2COONa$, $F(CF_2)_3O(CF_2CF_2O)_2CF_2COONa$, $F(CF_2)_4OCF_2CF_2OCF_2COONa$ or $F(CF_2)_4O(CF_2CF_2O)_2CF_2COONa$.

The emulsifier is more preferably sodium lauryl sulfate, ammonium perfluorooctanoate, $F(CF_2)_2OCF_2CF_2OCF_2COONH_4$, $F(CF_2)_3OCF_2CF_2OCF_2COONH_4$, or $F(CF_2)_4OCF_2CF_2OCF_2COONH_4$.

The content of the emulsifier is preferably from 0.01 to 15 parts by mass, more preferably from 0.1 to 10 parts by mass, based on 100 parts by mass of the aqueous medium.

As the radical polymerization initiator to be used in the emulsion polymerization, a water-soluble initiator is preferred, and as a specific example, a persulfate such as ammonium persulfate, or an organic initiator such as disuccinic acid peroxide or azobisisobutylamidine dihydrochloride may be mentioned. Preferred is a persulfate such as ammonium persulfate.

The redox polymerization initiator may, for example, be a redox initiator comprising a combination of a persulfate such as ammonium persulfate, an organic initiator such as hydrogen peroxide, disuccinic acid peroxide or azobisisobutylamidine dihydrochloride, or hydrogen peroxide with a reducing agent such as sodium hydroxymethanesulfinate, sodium hydrogensulfite or sodium thiosulfate, or an inorganic initiator of a system wherein a small amount of iron, a ferrous salt, silver sulfate or the like is coexistent therewith. Preferred is an ammonium persulfate/sodium hydroxymethanesulfinate/ferrous sulfate type, and it is more preferred to add disodium ethylenediaminetetraacetate thereto as a chelating agent. The content of the polymerization initiator is preferably from 0.0001 to 3 mass %, more preferably from 0.001 to 1 mass %, based on the monomers to be used for the copolymerization.

Further, in a case where the redox initiator is used, it is preferred to use a pH buffering agent in combination. As the pH buffering agent, an inorganic salt such as disodium hydrogenphosphate, sodium dihydrogenphosphate, sodium hydrogencarbonate or sodium carbonate may be used, and disodium hydrogenphosphate dihydrate or disodium hydrogenphosphate dodecahydrate may, for example, be mentioned.

The emulsion polymerization is preferably preformed in the presence of a chain transfer agent. As the chain transfer agent, an alcohol, a hydrocarbon, a mercaptan, a chlorofluorohydrocarbon, $R^{f2}I_2$ (wherein $R^{f2}$ is a $C_{1-16}$ saturated polyfluoroalkylene group, the same applies hereinafter) or $R^{f2}IBr$ may, for example, be used.

As the alcohol, a primary alcohol such as methanol or ethanol, or a secondary alcohol such as 1-methylpropanol, 1-methylbutanol, 1-methylpentaaol, 1-methylhexanol, 1-methylheptanol, 1-ethylhexanol or 1-propylpentanol may be mentioned.

As the hydrocarbon, methane, ethane, propane, butane, pentane, hexane or cyclohexane may, for example, be mentioned.

As the mercaptan, tert-dodecylmercaptan, n-dodecylmercaptan or n-octadecylmercaptan may, for example, be mentioned.

As the chlorofluorohydrocarbon, 1,3-dichloro-1,1,2,2,3-pentafluoropropane or 1,1-dichloro-1-fluoroethane may, for example, be mentioned.

As the $R^{f2}I_2$, 1,4-diiodoperfluorobutane may, for example, be mentioned. Further, as $R^{f2}IBr$, 1-bromo-4-iodoperfluorobutane may, for example, be mentioned.

The polymerization conditions such as the polymerization pressure and temperature may optionally be selected depending on the monomer composition, the decomposition temperature of the radical polymerization initiator or the redox polymerization initiator, etc. Usually, the polymerization pressure is preferably from 0.1 to 20 MPaG, more preferably from 0.3 to 10 MPaG, most preferably from 0.3 to 5 MPaG. The polymerization temperature is preferably from 0 to 100° C., more preferably from 10 to 90° C., most preferably from 20 to 80° C.

The repeating units (a) of the fluorinated polymer of the present invention are introduced preferably in a random structure in the fluorinated polymer. Forming the random structure will make the crosslinked rubber physical properties good.

The method for adding the monomer for repeating units (a) may, for example, be addition all at once, dividedly or continuously. In all the stages of the polymerization, preferred is to add the monome for repeating units (a) successively in a divided fashion or continuously in an amount to be in a specific molar ratio to the added amount of the monomer for repeating units (b) and, if necessary, the monomer for repeating units (c). By the addition successively in a divided fashion or continuously, the monomer for repeating units (a) can be introduced in the polymer randomly, and the crosslinked rubber physical properties will be good.

A fluorinated polymer latex obtained by the above emulsion polymerization is coagulated by a known method to isolate the fluorinated polymer. For the coagulation, a method of adding a metal salt, a method of adding an inorganic acid such as hydrochloric acid, a method of mechanical shearing or a method of freeze-thawing may, for example, be used.

When the fluorinated polymer of the present invention contains no repeating units based on at least one monomer selected from the group consisting of VdF, TFP, TeFP, TrFE, VF and DiFE, it is preferred to incorporate, as a crosslinking agent, a polymer comprising repeating units based on at least one monomer selected from the group consisting of VdF, TFP, TeFP, TrFE, VF and DiFE to the fluorinated polymer of the present invention. Further, when the fluorinated polymer of the present invention comprises repeating units based on at least one monomer selected from the group consisting of VdF, TFP, TeFP, TrFE, VF and DiFE, though it is not always necessary to incorporate a crosslinking agent because the fluorinated polymer has own crosslinkability, it is preferred to incorporate, as a crosslinking agent, a polymer comprising repeating units based on at least one monomer selected from the group consisting of VdF, TFP, TeFP, TrFE, VF and DiFE. By incorporating, as a crosslinking agent, a polymer comprising repeating units based on at least one monomer selected from the group consisting of VdF, TFP, TeFP, TrFE, VF and DiFE, it is possible to optionally adjust the crosslinkability and crosslinked rubber physical properties.

The Mooney viscosity (100° C.) of the polymer comprising repeating units based on at least one monomer selected from the group consisting of VdF, TFP, TeFP, TrFE, VF and DiFE, which is to be incorporated to the fluorinated polymer of the present invention, is preferably within a range of from 1 to 200, particularly preferably from 10 to 150.

Further, the content of the repeating units based on at least one monomer selected from the group consisting of VdF, TFP, TeFP, TrFE, VF and DiFE in the polymer to be incorporated is preferably from 0.05 to 99.9 (mol %), particularly preferably from 0.05 to 80 (mol %).

The polymer to be incorporated may, for example, be a VdF/HFP/TFE copolymer, a VdF/HFP copolymer, a VdF/TFE/P copolymer, a VdF/TFE/CTFE copolymer, a VdF/CTFE copolymer, a TFP/HFP/TFE copolymer, a TFP/HFP copolymer, a TFP/P/TFE copolymer, a TFP/TFE/CTFE copolymer, a TFP/CTFE copolymer, a VdF/TFP/HFP/TFE copolymer, a VdF/TFP/HFP copolymer, a TFE/P/VdF/TFP copolymer, a VdF/TFP/TFE/P copolymer, a VdF/TFP/TFE/CTFE copolymer, a VdF/TFP/CTFE copolymer, a VdF/TFP/TFE copolymer, a TeFP/TFE/P copolymer, a TrFE/TFE/P copolymer, a VF/TFE/P copolymer or a DiFE/TFE/P copolymer. Besides these, a TFE/P copolymer or the like may also be used. These polymers to be incorporated may be copolymers copolymerized in the presence of a saturated or unsaturated compound containing bromine and/or iodine.

With respect to the ratio of the fluorinated polymer of the present invention to the polymer comprising the repeating units based on at least one monomer selected from the group consisting of VdF, TFP, TeFP, TrFE, VF and DiFE to be incorporated, the fluorinated polymer of the present invention is from 99.5 to 10 mass %, preferably from 99.5 to 30 mass %, while the polymer comprising the repeating units based on at least one monomer selected from the group consisting of VdF, TFP, TeFP, TrFE, VF and DiFE to be incorporated is from 0.5 to 90 mass %, preferably from 0.5 to 70 mass %. The blend rubber within such a range will be excellent in the crosslinkability and chemical resistance. Further, it is possible to use only one of the above polymers to be incorporated or use two or more of them in combination.

Blending may be conducted by an optional method, for example, a kneading method by using e.g. an open roll or a mixer, a method of mixing in a latex state, followed by co-precipitation by means of e.g. salting out and a method of mixing in a solution state, followed by removing the solvent.

As the crosslinking agent, instead of the polymer comprising repeating units based on at least one monomer selected from the group consisting of VdF, TFP, TeFP, TrFE, VF and DiFE, it is possible to incorporate a fluorinated compound represented by the formula (2) $(CXY=CZO-)_k Q$ (wherein each of X, Y and Z which are independent of one another, is a hydrogen atom or a fluorine atom, and at least one among X, Y and Z is a fluorine atom, k is an integer of from 2 to 10, Q is a bonding group and represents an alkylene group, an alkylene group which may contain an oxygen atom, an aromatic ring or a polycyclic aromatic ring, and Q may contain a fluorine atom) to the fluorinated polymer of the present invention. Preferred is the fluorinated compound wherein each of X, Y and Z is a fluorine atom and k is 2 or 3.

Specific examples of such a fluorinated compound will be shown below, however the present invention is by no means thereby restricted.

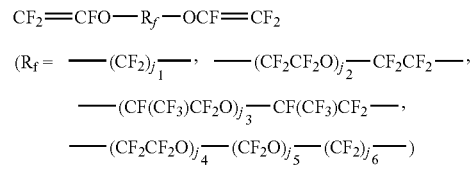

(VIII-1)

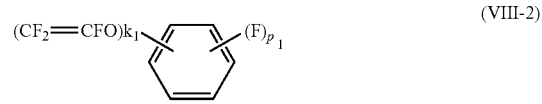

(VIII-2)

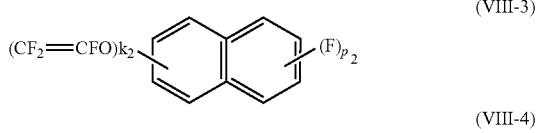

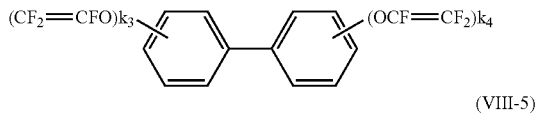

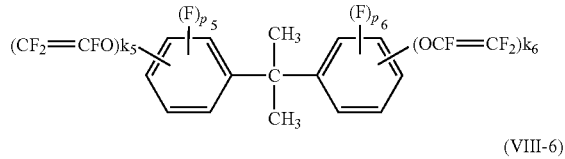

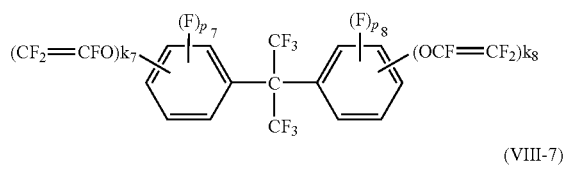

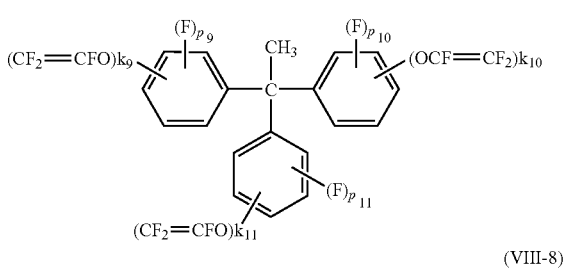

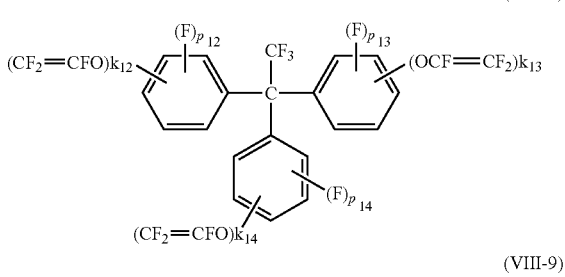

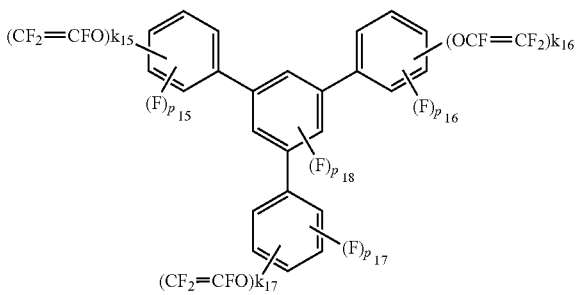

Among these formulae, the compound shown by (VIII-1) is a compound represented by the formula (2) wherein $k=2$. $R_f$ is one of divalent groups listed below the structural formula. Each of $j_1$, $j_2$ and $j_3$ is an integer of from 1 to 10, and $j_4=0$ to 10, $j_5 \geq 1$, $j_4+j_5=1$ to 10 and $j_6=1$ or 2. It is preferred that each of $j_1$, $j_2$ and $j_3$ is from 4 to 10, and $j_4+j_5=4$ to 10 and $j_6=1$.

The compound shown by (VIII-2) is a compound represented by the formula (2) wherein $k=k_1$. $k_1$ is an integer of from 2 to 6, $p_1$ is 0 or an integer of from 1 to 4 and $p_1 \leq 6-k_1$. It is preferred that $k_1=2$ to 4 and $p_1$ is 0 or $(6-k_1)$.

The compound shown by (VIII-3) is a compound represented by the formula (2) wherein $k=k_2$. $k_2$ is an integer of from 2 to 8, $p_1$ is C or an integer of from 1 to 8. It is preferred that $k_2=2$ to 4 and $p_2$ is 0 or $(8-k_2)$.

The compound shown by (VIII-4) is a compound represented by the formula (2) wherein $k=k_3+k_4$. $k_3+k_4=2$ to 10 and $p_3+p_4=0$ to 10, and $p_3 \leq 5-k_3$ and $p_4 \leq 5-k_4$. It is preferred that $k_3+k_4=2$ to 4, and $p_3=p_4=0$ or $p_3=5-k_3$ and $p_4=5-k_4$.

The compound shown by (VIII-5) is a compound represented by the formula (2) wherein $k=k_5+k_6$. $k_5+k_6=2$ to 10 and $p_5+p_6=0$ to 10, and $p_5 \leq 5-k_5$ and $p_6 \leq 5-k_6$. It is preferred that $k_5+k_6=2$ to 4, and $p_5=p_6=0$ or $p_5=5-k_5$ and $p_6=5-k_6$.

The compound shown by (VIII-6) is a compound represented by the formula (2) wherein $k=k_7+k_8$. $k_7+k_8=2$ to 10 and $p_7+p_8=0$ to 10, and $p_7 \leq 5-k_7$ and $p_8 \leq 5-k_8$. It is preferred that $k_7+k_8=2$ to 4, and $p_7=p_8=0$ or $p_7=5-k_7$ and $p_8=5-k_8$.

The compound shown by (VIII-7) is a compound represented by the formula (2) wherein $k=k_9+k_{10}+k_{11}$. $k_9+k_{10}+k_{11}=2$ to 10 and $p_9+p_{10}+p_{11}=0$ to 15, and $p_9 \leq 5-k_9$, $p_{10} \leq 5-k_{10}$ and $p_{11} \leq 5-k_{11}$. It is preferred that $k_9+k_{10}+k_{11}=2$ to 4, and $p_9=p_{10}=p_{11}=0$ or $p_9=5-k_9$, $p_{10}=5-k_{10}$ and $p_{11}=5-k_{11}$.

The compound shown by (VIII-8) is a compound represented by the formula (2) wherein $k=k_{12}+k_{13}+k_{14}$. $k_{12}+k_{13}+k_{14}=2$ to 10 and $p_{12}+p_{13}+P_{14}=0$ to 15, and $p_{12} \leq 5-k_{12}$, $p_{13} \leq 5-k_{13}$ and $P_{14} \leq 5-k_{14}$. It is preferred that $k_{12}+k_{13}+k_{14}=2$ to 4, and $p_{12}=p_{13}=p_{14}=0$ or $p_{12}=5-k_{12}$, $p_{13}=5-k_{13}$ and $p_{14}=5-k_{14}$.

The compound shown by (VIII-9) is a compound represented by the formula (2) wherein $k=k_{15}+k_{16}+k_{17}$. $k_{15}+k_{16}+k_{17}=2$ to 10 and $p_{15}+p_{16}+p_{17}=0$ to 15, and $p_{15} \leq 5-k_{15}$, $p_{16} \leq 5-k_{16}$ and $p_{17} \leq 5-k_{17}$, and $p_{18}=0$ to 3. It is preferred that $k_{15}+k_{16}+k_{17}=2$ to 4, $p_{15}=p_{16}=P_{17}=0$ or $p_{15}=5-k_{15}$, $p_{16}=5-k_{16}$ and $p_{17}=5-k_{17}$, and $P_{18}=0$ or 3.

The amount of the crosslinking agent of the formula (2) is generally preferably from 0.02 to 30 parts by mass, more preferably from 0.2 to 20 parts by mass, further more preferably from 0.5 to 10 parts by mass, based on 100 parts by mass of the fluorinated polymer of the present invention.

The crosslinked fluororubber of the present invention is obtained by crosslinking the fluorinated polymer of the present invention or the blend rubber of the fluorinated polymer of the present invention with the polymer comprising repeating units based on at least one monomer selected from the group consisting of VdF, TFP, TeFP, TrFE, VF and DiFE.

In the present invention, the crosslinking is preferably carried out by heat, radiation, etc. As the radiation to be emitted, an electron ray or an ultraviolet ray may, for example, be mentioned. For the operation at the time of crosslinking, an operation which has been commonly employed, may be adopted. It is possible that the temperature at the time of heat crosslinking is usually from about 60 to 250° C., preferably from about 120 to 200° C.

It is preferred to incorporate a quaternary onium salt and an acid scavenger to the crosslinking system of the fluorinated polymer of the present invention or the blend rubber of the fluorinated polymer of the present invention with the polymer comprising repeating units based on at least one monomer selected from the group consisting of VdF, TFP, TeFP, TrFE, VF and DiFE.

As the quaternary onium salt, at least one selected from a phosphonium salt represented by the formula (3) and an ammonium salt represented by the formula (4) is mentioned.

$$(R^{10}R^{11}R^{12}R^{13})P^+X^- \quad (3)$$

$$(R^{10}R^{11}R^{12}R^{13})N^+X^- \quad (4)$$

(wherein each of $R^{10}$ to $R^{13}$ is a $C_{1-25}$ alkyl group, alkoxy group, aryl group, alkylaryl group, aralkyl group or polyoxyalkylene group, P is a phosphorus atom, N is a nitrogen atom, or two or three of them may form together with P or N, a heterocyclic structure, and $X^-$ is an anion such as $Cl^-$, $Br^-$, $I^-$, $HSO_4^-$, $H_2PO_4^-$, $RCOO^-$, $ROSO_2^-$, $RSO^-$, $ROPO_2H^-$, $CO_3^{2-}$, $BF_4^-$, $PF_6^-$ or $OH^-$).

A specific example may be a quaternary ammonium salt such as tetraethyl ammonium bromide, tetrabutyl ammonium chloride, tetrabutyl ammonium bromide, tetrabutyl ammonium iodide, tetrabutyl ammonium hydroxide, n-dodecyl trimethyl ammonium bromide, cetyl dimethyl benzyl ammonium chloride, methyl cetyl dibenzyl ammonium bromide, cetyl dimethyl ethyl ammonium bromide, octadecyl trimethyl ammonium bromide, cetyl pyridinium chloride, cetyl pyridinium bromide, cetyl pyridinium iodide, cetyl pyridinium sulfate, 1-benzyl pyridinium chloride, 1-benzyl-3,5-dimethyl pyridinium chloride, 1-benzyl-4-phenyl pyridinium chloride, 1,4-dibenzyl pyridinium chloride, 1-benzyl-4-(pyrrolidinyl)pyridinium chloride, 1-benzyl-4-pyridino pyridinium chloride, tetraethyl ammonium acetate, trimethyl benzyl ammonium benzoate, trimethyl benzyl ammonium p-toluenesulfonate, trimethyl benzyl ammonium borate, 1,8-diazabicyclo[5,4,0]undecene-7,8-benzyl-1,8-diazabicyclo[5,4,0]-undec-7-enium chloride, 1,8-diazabicyclo[5,4,0]-undecene-7-methylammonium methosulfate, 5-benzyl-1,5-diazabicyclo[4,3,0]-5-nonenium chloride or 5-benzyl-1,5-diazabicyclo[4,3,0]-5-nonenium bromide, 5-benzyl-1,5-diazabicyclo[4,3,0]-5-nonenium tetrafluoroborate or 5-benzyl-1,5-diazabicyclo[4,3,0]-5-nonenium hexafluorophosphate, or a quaternary phosphonium salt such as tetraphenyl phosphonium chloride, triphenyl benzyl phosphonium chloride, triphenyl benzyl phosphonium bromide, triphenyl methoxymethyl phosphonium chloride, triphenyl methylcarbonylmethyl phosphonium chloride, triphenyl ethoxycarbonylmethyl phosphonium chloride, trioctylbenzyl phosphonium chloride, trioctylmethyl phosphonium bromide, trioctylethyl phosphonium acetate, trioctylethyl phosphonium dimethylphosphate, tetraoctyl phosphonium chloride or cetyldimethy benzylphosphonium chloride.

The amount of the quaternary onium salt is about from 0.1 to 30 parts by mass, preferably about from 0.1 to 20 parts by mass, based on 100 parts by mass of the fluorinated polymer of the present invention or the blend rubber of the fluorinated polymer of the present invention with another fluorinated polymer.

As the acid scavenger, at least one selected from divalent and higher valent metal oxides and hydroxides such as calcium hydroxide, magnesium oxide, zinc oxide, titanium oxide or lead oxide is mentioned. The amount of the acid scavenger is preferably from about 0.1 to 30 parts by mass, more preferably from 0.1 to 20 parts by mass, based on 100 parts by mass of the blend rubber.

At the time of crosslinking the fluorinated polymer of the present invention or this blend rubber of the fluorinated polymer of the present invention with the polymer comprising repeating units based on at least one monomer selected from the group consisting of VdF, TFP, TeFP, TrFE, VF and DiFE, it is preferred to optionally incorporate e.g. a reinforcing agent, a filler or an additive to the blend rubber. As the reinforcing agent or the filler, a rubber reinforcing agent or a filler which have been commonly used at the time of producing a conventional crosslinked rubber may, for example, be mentioned. For example, an inorganic reinforcing agent such as carbon black such as channel black, furnace black, acetylene black or thermal black, white carbon, magnesium carbonate, or surface-treated calcium carbonate, an inorganic filler such as calcium carbonate, clay, talc, silica, diatomaceous earth, alumina or barium sulfate, or another filler may be mentioned. As the additive, a pigment, an anti-oxidant, a stabilizer, a processing aid or an internal mold release agent may, for example, be mentioned. The reinforcing agents, fillers and additives may respectively be used alone or in combination as a mixture of two or more of them.

The amount of the reinforcing agent to be mixed may suitably be selected, but it is preferably from 1 to 100 parts by mass based on 100 parts by mass of the fluorinated polymer. The amount of the filler to be mixed may suitably be selected, but it is preferably from 1 to 100 parts by mass based on 100 parts by mass of the fluorinated polymer.

At the time of crosslinking the fluorinated polymer of the present invention or the blend rubber of the fluorinated polymer of the present invention with the polymer comprising repeating units based on at least one monomer selected from the group consisting of VdF, TFP, TeFP, TrFE, VF and DiFE, a known polyhydroxy compound or its salt is preferably incorporated as a crosslinking agent to the blend rubber, though it is not always necessary to incorporate it. Particularly preferred is 2,2-bis(4-hydroxyphenyl)propane [bisphenol A], 2,2-bis(4-hydroxyphenyl) perfluoropropane [bisphenol AF] or hydroquinone. Each of them may be a salt of e.g. an alkali metal, an alkaline earth metal or an organic onium compound.

The amount of the polyhydroxy compound or its salt is preferably from 0.001 to 10 parts by mass based on 100 parts by mass of the fluorinated polymer of the present invention or the blend rubber of the fluorinated polymer of the present invention with the polymer comprising repeating units based on at least one monomer selected from the group consisting of VdF, TFP, TeFP, TrFE, VF and DiFE.

EXAMPLES

Now, the present invention will be described in further detail with reference to Examples. However, the present invention is by no means restricted thereto. Further, the respective measurements of the copolymer composition of the fluorinated polymer, the Mooney viscosity and the physical properties of the crosslinked fluororubber were conducted by the following methods.

(Copolymer Composition of the Fluorinated Polymer)

A fluorinated polymer was dissolved in deuterated tetrahydrofuran, and $^{13}C$-NMR was measured to analyze the copolymer composition.

(Mooney Viscosity)

The Mooney viscosity is a value measured in accordance with JIS K6300 by using a large rotor having a diameter of 38.1 mm and a thickness of 5.54 mm, at 100° C. for a preheating time of 1 minute for a rotating time of 4 minutes. The larger the value, the higher the molecular weight.

Example 1

Polymer A: TFE/P/vinyl p-hydroxybenzoate Copolymer

After deaerating a pressure resistant reactor made of stainless steel having an internal volume of 3,200 mL, equipped with a stirring anchor blade, 1,600 g of deionized water, 40 g of disodium hydrogenphosphate dodecahydrate, 0.5 g of sodium hydroxide, 97 g of tert-butanol, 9 g of sodium lauryl sulfate and 2.5 g of ammonium persulfate were charged. Further, an aqueous solution, having 0.4 g of disodium ethylenediaminetetraacetate dihydrate (hereinafter referred to as EDTA) and 0.3 g of ferrous sulfate heptahydrate, preliminarily dissolved in 200 g of deionized water, was introduced. Then, at 40° C., a mixed monomer gas of TFE/P=85/15 (molar ratio) was fed so as to bring the internal pressure of the reactor to be 2.5 MPaG. The anchor blade was stirred at 300 rpm, and a 2.5 mass % sodium hydroxymethanesulfinate dihydrate (hereinafter sometimes referred to as Rongalit) aqueous solution was added to initiate the polymerization reaction.

As the polymerization proceeded, the pressure decreased. Accordingly, when the internal pressure of the reactor decreased to 2.49 MPaG, a mixed gas of TFE/P=56/44 (molar ratio) was fed to increase the internal pressure of the reactor to 2.51 MPaG. The polymerization reaction was continued by repeating this operation to maintain the internal pressure of the reactor to be from 2.49 to 2.51 MPaG. When the amount of the TFE/P mixed gas added reached 10 g, 1 mL of a 13.2 mass % tert-butanol solution of vinyl p-hydroxybenzoate was fed into the reactor. Thereafter, until the amount of the TFE/P mixed gas added reached 790 g, every time when 10 g of the TFE/P mixed gas was added, 1 mL of the tert-butanol solution of vinyl p-hydroxybenzoate was fed for 79 times in total. When the total amount of the TFE/P mixed gas added reached 800 g, the addition of the Rongalit aqueous solution was stopped, and the internal temperature of the reactor was lowered to 10° C. to terminate the polymerization reaction to obtain a TFE/P/vinyl p-hydroxybenzoate copolymer latex. The amount of the Rongalit aqueous solution used was 23 g. The polymerization time was about 7 hours.

Then, the latex was added to a 5 mass % calcium chloride aqueous solution to coagulate the latex by salting out to obtain a TFE/P/vinyl p-hydroxybenzoate copolymer (referred to as polymer A). The copolymer thus precipitated was collected by filtration, washed with deionized water and dried in an oven at 100° C. for 12 hours to obtain 790 g of a white TFE/P/vinyl p-hydroxybenzoate copolymer.

In the infrared spectrum of the copolymer, an absorption based on a carbonyl group of vinyl p-hydroxybenzoate in the vicinity of 1,700 cm$^{-1}$ was confirmed. The composition of the copolymer was such that repeating units based on TFE/repeating units based on P/repeating units based on vinyl p-hydroxybenzoate=55.3/44.7/0.49 (molar ratio). The Mooney viscosity was 135.

Example 2

Polymer B: TFE/P/vinyl p-hydroxybenzoate Copolymer

After deaerating a pressure resistant reactor made of stainless steel having an internal volume of 3,200 mL, equipped with a stirring anchor blade, a uniformly mixed liquid consisting of 1,600 g of deionized water, 3 g of sodium hydrogen carbonate, 97 g of tert-butanol and 9 g of sodium lauryl sulfate were charged. Then, the internal solution of the reactor was heated to 75° C., and a mixed monomer gas of TFE/P=85/15 (molar ratio) preliminarily prepared was fed so as to bring the internal pressure of the reactor to be 1.85 MPaG. The anchor blade was stirred at 300 rpm, and a 25 g of 10 mass % solution of ammonium persulfate was added to initiate the polymerization reaction.

As the polymerization proceeded, the pressure decreased. Accordingly, when the internal pressure of the reactor decreased to 1.84 MPaG, a mixed gas of TFE/P=56/44 (molar ratio) preliminarily prepared was fed by its own pressure to increase the internal pressure of the reactor to 1.86 MPaG. The polymerization reaction was continued by repeating this operation to maintain the internal pressure of the reactor to be from 1.84 to 1.86 MPaG. When the amount of the TFE/P mixed gas added reached 10 g, 1 mL of a 13.2 mass % tert-butanol solution of vinyl p-hydroxybenzoate preliminarily prepared was fed into the reactor. Thereafter, until the amount of the TFE/P mixed gas added reached 790 g, every time when 10 g of the TFE/P mixed gas was added, 1 mL of the tert-butanol solution of vinyl p-hydroxybenzoate was fed for 79 times in total. When the total amount of the TFE/P mixed gas added reached 800 g, the internal temperature of the reactor was lowered to 10° C. to terminate the polymerization reaction to obtain a TFE/P/vinyl p-hydroxybenzoate copolymer latex. The polymerization time was about 8 hours.

Then, in the same manner as in Example 1, by salting out, washing and drying, 789 g of a white TFE/P/vinyl p-hydroxybenzoate copolymer (referred to as polymer B) was obtained.

In the infrared spectrum of the copolymer, an absorption based on a carbonyl group of vinyl p-hydroxybenzoate in the vicinity of 1,700 cm$^{-1}$ was confirmed. The composition of the copolymer was such that repeating units based on TFE/repeating units based on P/repeating units based on vinyl p-hydroxybenzoate=55.3/44.7/0.50 (molar ratio). The Mooney viscosity was 70.

Example 3

Polymer C: TFE/P/VdF/vinyl p-hydroxybenzoate Copolymer

After deaerating a pressure resistant reactor made of stainless steel having an internal volume of 3,200 mL, equipped with a stirring anchor blade, 1,600 g of deionized water, 21 g of disodium hydrogenphosphate dodecahydrate, 2.5 g of sodium hydroxide, 113 g of tert-butanol, 10 g of sodium lauryl sulfate and 15 g of ammonium persulfate were charged. Further, an aqueous solution, having 1.2 g of disodium ethylenediaminetetraacetate dihydrate (hereinafter referred to as EDTA) and 0.9 g of ferrous sulfate heptahydrate, preliminarily dissolved in 200 g of deionized water, was introduced. Then, at 40° C., a mixed monomer gas of TFE/P/VdF=69/15/16 (molar ratio) was fed so as to bring the internal pressure of the reactor to be 2.25 MPaG. The anchor blade was stirred at 168 rpm, and a 19 mass % sodium hydroxymethanesulfinate dihydrate (hereinafter sometimes referred to as Rongalit) aqueous solution was added to initiate the polymerization reaction.

As the polymerization proceeded, the pressure decreased. Accordingly, when the internal pressure of the reactor decreased to 2.24 MPaG, a mixed gas of TFE/P/VdF=56/44/4 (molar ratio) was fed to increase the internal pressure of the reactor to 2.26 MPaG. The polymerization reaction was continued by repeating this operation to maintain the internal pressure of the reactor to be from 2.24 to 2.26 MPaG. When the amount of the TFE/P/VdF mixed gas added reached 10 g, 1 mL of a 13.2 mass % tert-butanol solution of vinyl p-hydroxybenzoate was fed into the reactor. Thereafter, until the amount of the TFE/P/VdF mixed gas added reached 790 g, every time when 10 g of the TFE/P/VdF mixed gas was added, 1 mL of the tert-butanol solution of vinyl p-hydroxybenzoate was fed for 79 times in total. When the total amount of the TFE/P/VdF mixed gas added reached 800 g, the addition of the Rongalit aqueous solution was stopped, and the internal temperature of the reactor was lowered to 10° C. to terminate the polymerization reaction to obtain a TFE/P/VdF/vinyl p-hydroxybenzoate copolymer latex. The amount of the Rongalit aqueous solution used was 23 g. The polymerization time was about 7 hours.

Then, the latex was added to a 10 mass % potassium chloride aqueous solution to coagulate the latex by salting out to obtain a TFE/P/VdF/vinyl p-hydroxybenzoate copolymer (referred to as polymer C). The copolymer thus precipitated was collected by filtration, washed with deionized water and dried in an oven at 100° C. for 12 is hours to obtain 792 g of a white TFE/P/VdF/vinyl p-hydroxybenzoate copolymer.

In the infrared spectrum of the copolymer, an absorption based on a carbonyl group of vinyl p-hydroxybenzoate in the vicinity of 1,700 cm$^{-1}$ was confirmed. The composition of the copolymer was such that repeating units based on TFE/repeating units based on P/repeating units based on VdF/repeating units based on vinyl p-hydroxybenzoate=52.1/43.9/4/0.48 (molar ratio). The Mooney viscosity was 90.

Production Example 1

Polymer D: TFE/P Copolymer)

TFE/P copolymer latex was obtained in the same manner as in Example 1 except that vinyl p-hydroxybenzoate was not used. The amount of the Rongalit aqueous solution used was 24 g. The polymerization time was about 6.8 hours.

In the same manner as in Example 1, by salting out, washing and drying the latex, 398 g of a white TFE/P copolymer (referred to as polymer D) was obtained. The composition of the copolymer was such that repeating units based on TFE/repeating units based on P=55.8/44.2 (molar ratio). The Mooney viscosity was 130.

Production Example 2

Polymer E3: HFP/VdF Copolymer

After deaerating a pressure resistant reactor made of stainless steel having an internal volume of 3,200 mL, equipped with a stirring anchor blade, 1,600 g of deionized water and 7.5 g of ammonium perfluorooctanoate were charged. Then, at 60° C., a mixed monomer gas of HFP/VdF=57/43 (molar ratio) was fed so as to bring the internal pressure of the reactor to be 1.0 MPaG. Further, the solution wherein 3.5 g of ammonium persulfate was dissolved in 50 g of deionized water, was fed to initiate the polymerization reaction.

As the polymerization proceeded, the pressure decreased. Accordingly, when the internal pressure of the reactor decreased to 0.99 MPaG, a mixed gas of HFP/VdF=20/80 (molar ratio) was fed to increase the internal pressure of the reactor to 1.01 MPaG. The polymerization reaction was continued for 5 hours by repeating this operation to maintain the internal pressure of the reactor to be from 0.99 to 1.01 MPaG. After the reaction was finished, the mixing gas unreacted was purged to terminate the reaction.

Then, the latex was coagulated by salting out and then thoroughly washed and dried to obtain a HFP/VdF=21/79 (molar ratio) copolymer (referred to as polymer E). The Mooney viscosity was 92.

Production Example 3

Polymer F: TEF/P/VdF Copolymer

After deaerating a pressure resistant reactor made of stainless steel having an internal volume of 3,200 mL, equipped with a stirring anchor blade, 1,600 g of deionized water, 21 g of disodium hydrogenphosphate dodecahydrate, 2.5 g of sodium hydroxide, 200 g of tert-butanol, 8.5 g of sodium lauryl sulfate and 7.8 g of ammonium persulfate were charged. Further, an aqueous solution, having 1.2 g of disodium ethylenediaminetetraacetate dihydrate (hereinafter referred to as EDTA) and 0.9 g of ferrous sulfate heptahydrate, preliminarily dissolved in 200 g of deionized water, was introduced. Then, at 25° C., a mixed monomer gas of TFE/P/VdF=25.5/6/68.75 (molar ratio) was fed so as to bring the internal pressure of the reactor to be 2.30 MPaG. The anchor blade was stirred at 168 rpm, and a 6.5 mass % sodium hydroxymethanesulfinate dihydrate (hereinafter sometimes referred to as Rongalit) aqueous solution was added to initiate the polymerization reaction.

As the polymerization proceeded, the pressure decreased. Accordingly, when the internal pressure of the reactor decreased to 2.29 MPaG, a mixed gas of TFE/P/VdF=38.5/26.2/35.3 (molar ratio) was fed to increase the internal pressure of the reactor to 2.31 MPaG. The polymerization reaction was continued by repeating this operation to maintain the internal pressure of the reactor to be from 2.29 to 2.31 MPaG. When the amount of the TFE/P/VdF mixed gas added reached 800 g, the addition of the Rongalit aqueous solution was stopped, and the internal temperature of the reactor was lowered to 10° C. to terminate the polymerization reaction to obtain a TFE/P/VdF copolymer latex. The amount of the Rongalit aqueous solution used was 25 g. The polymerization time was about 8 hours.

Then, the latex was added to a 10 mass % potassium chloride aqueous solution to coagulate the latex by salting out to obtain a TFE/P/VdF copolymer (referred to as polymer F). The copolymer thus precipitated was collected by filtration, washed with deionized water and dried in an oven at 100° C. for 1.2 hours to obtain 788 g of a white TFE/P/VdF copolymer.

The composition of the copolymer was such that repeating units based on TFE/repeating units based on P/repeating units based on VdF=39.1/25.0/35.9 (molar ratio). The Mooney viscosity was 60.

Examples 4 to 9 and Comparative Examples 1 and 2

By using the fluorinated polymers (polymers A to F) produced as described above, in accordance with the components and amounts as shown in Table 1, those various components were uniformly mixed by means of twin rollers to prepare fluorinated polymer compositions. These fluorinated polymer compositions were subjected to press crosslinking at 170° C. for 20 minutes and then subjected to secondary crosslinking in an oven at 230° C. for 24 hours.

In accordance with JIS K6231 and JIS K6253, the fundamental properties and chemical resistance of the crosslinked products obtained in Examples and Comparative Examples were measured. The results are shown in Table 1.

Further, in Tables "parts" as an unit of an amount means "parts by mass".

TABLE 1

|  | Ex. 4 | Ex. 5 | Ex. 6 | Ex. 7 | Ex. 8 | Ex. 9 | Comp. Ex. 1 | Comp. Ex. 2 |
|---|---|---|---|---|---|---|---|---|
| Components (parts) | | | | | | | | |
| Polymer A | 100 | 100 | 100 | 100 | — | — | — | — |
| Polymer B | — | — | — | — | 100 | — | — | — |
| Polymer C | — | — | — | — | — | 100 | — | — |
| Polymer D | — | — | — | — | — | — | 100 | — |
| Polymer E | 5 | — | 5 | — | 5 | — | 5 | 100 |
| Polymer F | — | 10 | — | 10 | — | — | — | — |

TABLE 1-continued

|  | Ex. 4 | Ex. 5 | Ex. 6 | Ex. 7 | Ex. 8 | Ex. 9 | Comp. Ex. 1 | Comp. Ex. 2 |
|---|---|---|---|---|---|---|---|---|
| MT carbon | 30 | 30 | 30 | 30 | 30 | 30 | 30 | 30 |
| Kyowa Mag #150*[1] | 3 | 3 | 3 | 3 | 3 | 3 | 3 | 3 |
| Calvit*[2] | 6 | 6 | 6 | 6 | 6 | 6 | 6 | 6 |
| Bisphenol AF | — | — | 1 | 1 | — | — | — | 1 |
| TBAOH*[3] | 0.8 | 0.8 | 0.8 | 0.8 | 0.8 | 0.8 | 0.8 | — |
| Sulfolane*[4] | 1.5 | 1.5 | 1.5 | 1.5 | 1.5 | 1.5 | 1.5 | — |
| DBU*[5] | 0.1 | 0.1 | 0.1 | 0.1 | 0.1 | 0.1 | 0.1 | — |
| TPBPC*[6] | — | — | — | — | — | — | — | 0.4 |
| Fundamental properties |  |  |  |  |  |  |  |  |
| Tensile strength (MPa) | 22.4 | 16.5 | 21.6 | 19.3 | 14.5 | 20.6 | 6.5 | 15.7 |
| M100 (MPa) | 13.9 | 6.9 | 12.8 | 10.2 | 8.9 | 8.5 | 4.9 | 5.2 |
| Hardness (Shore-A) | 76 | 72 | 76 | 73 | 76 | 73 | 59 | 72 |
| Chemical resistance |  |  |  |  |  |  |  |  |
| Chemical resistance after immersion in ethylene diamine (30° C. × 168 hours) |  |  |  |  |  |  |  |  |
| Change in tensile strength (%) | −15 | −12 | — | — | — | — | — | Disintegrated* |
| Hardness change (point) | −3 | −2 | — | — | — | — | — | Disintegrated* |
| Change in volume (%) | +4.5 | +5.0 | — | — | — | — | — | Disintegrated* |
| Chemical resistance after immersion in a 50 mass % sodium hydroxide solution (30° C. × 168 hours) |  |  |  |  |  |  |  |  |
| Change in tensile strength (%) | −3 | −3 | — | — | — | — | — | Disintegrated* |
| Hardness change (point) | −2 | −3 | — | — | — | — | — | Disintegrated* |
| Change in volume (%) | 0.1 | 0.3 | — | — | — | — | — | Disintegrated* |

The abbreviated or brand names having annotations in Table 1 are the following substances.
*[1]Kyowa Mag #150: magnesium oxide (Kyowa Chemical Industry Co., Ltd.)
*[2]Calvit: calcium hydroxide (Ohmi Kagaku Kogyo K.K.)
*[3]TBAOH: tetrabutyl ammonium hydroxide
*[4]Sulfolane: tertahydrothiophene-1,1-dioxide
*[5]DBU: 1,8-diazabicyclo[5,4,0]-undecene-7
*[6]TPBPC: triphenyl benzyl phosphonium chloride Additionally, "Disintegrated" in Table 1 means that it was impossible to measure the physical properties because the sample for evaluations was dissolved in the reagent and lost the original form.

The fluorinated polymer compositions in Examples 1 to 6 showed excellent crosslinked rubber physical properties as compared with the fluorinated copolymer having no crosslinking moiety in Comparative Example 1. Further, with respect to the chemical resistant test, in which a sample was immersed in ethylenediamine and a 50 mass % sodium hydroxide solution at 30° C. for 168 hours, as compared with the fluorinated copolymer composition in Comparative Example 2 which was disintegrated, the fluorinated polymer compositions in Examples 1 and 2 had low rate of change in tensile strength, hardness change and rate of change in volume after immersion, and showed the crosslinked rubber physical properties remarkably excellent in anti basic chemical resistance.

Example 10 and Comparative Examples 4 and 5

By using the fluorinated polymer (polymer A) produced as described above, in accordance with the components and amounts as shown in Table 2, those various components were uniformly mixed by means of twin rollers to prepare fluorinated polymer compositions.

The crosslinking physical properties of these fluorinated polymer compositions thus obtained were measured at an angle of 3° at 177° C. for 12 minutes by means of a rubber process analyzer (RPA manufactured by ALPHA TECHNOLOGIES).

With respect to the crosslinking properties, ML indicates the minimum torque after initiating the measurement, and then the crosslinking further proceeds and MH indicates the maximum torque, and MH-ML indicates the degree of crosslinking.

TABLE 2

|  | Example 10 | Comparative Example 4 | Comparative Example 5 |
|---|---|---|---|
| Components (parts) |  |  |  |
| Polymer A | 100 | 100 | 100 |
| MT carbon | 30 | 30 | 30 |
| Kyowa Mag #150*[1] | 3 | 3 | — |

TABLE 2-continued

|  | Example 10 | Comparative Example 4 | Comparative Example 5 |
|---|---|---|---|
| Calvit*2 | 6 | 6 | — |
| CF$_2$=CFO—(CF$_2$)$_4$—OCF=CF$_2$ perfluoro(1,4-divinyloxybutane) | 1.8 | — | 1.8 |
| DBU*5 | 0.6 | 0.6 | 0.6 |
| Crosslinked rubber physical properties |  |  |  |
| ML | 5.9 | 6.05 | 2.49 |
| MH | 10.9 | 6.26 | 2.52 |
| MH-ML | 5.0 | 0.21 | 0.03 |

The abbreviated and brand names shown in Table 2 indicate the same substances as the substances in Table 1.

INDUSTRIAL APPLICABILITY

The fluorinated polymer produced by the process of the present invention is a copolymer having elasticity excellent in crosslinking reactivity, and can be applied to various applications where fluororubber is used. The fluorinated polymer and the crosslinked fluororubber obtained by crosslinking its composition may be used for O-rings, sheets, gaskets, oil seals, diaphragms, V-rings etc, and may be applied to a heat resistant/chemical resistant sealing material, a wire-covering material, a sealing material for semiconductor devices, a material for corrosion resistant rubber coating, a sealing material for urea-resistant greases, etc.

The entire disclosures of Japanese Patent Application No. 2006-265742 filed on Sep. 28, 2006 and Japanese Patent Application No. 2007-101170 filed on Apr. 6, 2007 including specifications, claims and summaries are incorporated herein by reference in their entireties.

What is claimed is:

1. A fluorinated polymer comprising repeating units (a) based on at least one monomer selected from the group consisting of compounds represented by the following formulae [I], [II], [III], [IV], [V] and [VI], as the ethylenic unsaturated compounds each having a hydroxyphenyl group:

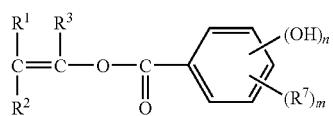

[I]

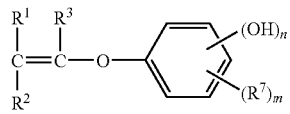

[II]

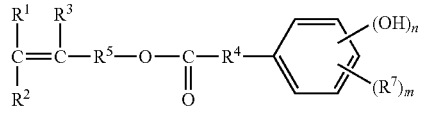

[III]

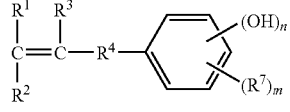

[IV]

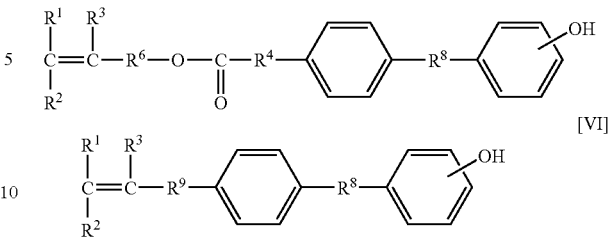

[V]

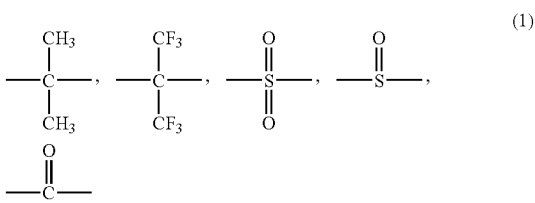

[VI]

(wherein each of $R^1$ and $R^2$ which are independent of each other, is a hydrogen atom, a fluorine atom, a $C_{1-10}$ alkyl group or a $C_{1-10}$ alkoxyalkyl group containing an etheric oxygen atom, $R^3$ is a hydrogen atom, a fluorine atom or a methyl group, each of $R^4$ and $R^6$ is a single bond or a $C_{1-10}$ alkylene group which may contain an etheric oxygen atom, $R^5$ is a $C_{1-10}$ alkyl group which may contain an etheric oxygen atom, $R^7$ is a $C_{1-5}$ alkyl group, $R^9$ is a single bond, an oxygen atom or a $C_{1-10}$ alkylene group which may contain an etheric oxygen atom, and $R^8$ is one of groups represented by the formula (1):

$$-\overset{CH_3}{\underset{CH_3}{C}}-, \quad -\overset{CF_3}{\underset{CF_3}{C}}-, \quad -\overset{O}{\underset{O}{S}}-, \quad -\overset{O}{S}-, \quad -\overset{O}{C}- \tag{1}$$

wherein n is an integer of from 1 to 5, and m is 0 or an integer of from 1 to 4, provided that n+m≦5), and having a Mooney viscosity (100° C.) of 10 to 200, which comprises the above repeating units (a), repeating units (b) based on at least one fluoromonomer selected from the group consisting of tetrafluoroethylene, hexafluoropropylene, vinylidene fluoride, 3,3,3-trifluoropropene, 1,3,3,3-tetrafluoropropene, 1,1,2-trifluoroethylene, vinyl fluoride, 1,2-difluoroethylene and CF$_2$=CF—O—R$^f$ (wherein R$^f$ is a C$_{1-8}$ saturated perfluoroalkyl group or a perfluoro(alkoxyalkyl) group) and, if necessary, repeating units (c) based on at least one hydrocarbon monomer selected from the group consisting of ethylene, propylene and CH$_2$=CH—O—R$^1$ (wherein R$^1$ is a C$_{1-8}$ saturated alkyl group or an alkoxyalkyl group), wherein (a)/((b)+(c))=0.0001 to 0.1 (molar ratio).

2. The fluorinated polymer according to claim 1, wherein the above repeating units (b) are based on at least one fluoromonomer selected from the group consisting of tetrafluoroethylene, vinylidene fluoride, 3,3,3-trifluoropropene, 1,3,3,3-tetrafluoropropene, 1,1,2-trifluoroethylene, vinyl fluoride and 1,2-difluoroethylene, and the above repeating units (c) are based on propylene.

3. The fluorinated polymer according to claim 1, wherein the above repeating units (b) are based on at least one fluoromonomer selected from the group consisting of tetrafluoroethylene, hexafluoropropylene, vinylidene fluoride, 3,3,3-trifluoropropene, 1,3,3,3-tetrafluoropropene, 1,1,2-trifluoroethylene, vinyl fluoride and 1,2-difluoroethylene.

4. The fluorinated polymer according to claim 1, wherein the above repeating units (b) are based on at least one fluoromonomer selected from the group consisting of tetrafluoroethylene and $CF_2=CF-O-R^f$ (wherein $R^f$ is a $C_{1-8}$ saturated perfluoroalkyl group or a perfluoro(alkoxyalkyl) group).

5. The fluorinated polymer according to claim 1, wherein in the above formulae [I] and [II], each of $R^1$ and $R^2$ is a hydrogen atom, $R^3$ is a hydrogen atom or a methyl group, and n is 1.

6. The fluorinated polymer according to claim 1, wherein the above repeating units (a) are based on vinyl p-hydroxybenzoate, the above repeating units (b) are based on tetrafluoroethylene, the above repeating units (c) are based on propylene, wherein (c)/(b)=40/60 to 60/40 (molar ratio) and (a)/((b)+(c))=0.0001 to 0.05 (molar ratio).

7. A vulcanizable fluorinated polymer composition obtainable by incorporating, as a crosslinking agent, a polymer comprising repeating units based on at least one monomer selected from the group consisting of vinylidene fluoride, tetrafluoropropylene, 1,3,3,3-tetrafluoropropene, 1,1,2-trifluoroethylene, vinyl fluoride and 1,2-difluoroethylene to the fluorinated polymer as defined in claim 1.

8. A vulcanizable fluorinated polymer composition obtainable by incorporating, as a crosslinking agent, a fluorinated compound represented by the formula $(CXY=CZO-)_kQ$ (wherein each of X, Y and Z which are independent of one another, is a hydrogen atom or a fluorine atom, and at least one among X, Y and Z is a fluorine atom, k is an integer of from 2 to 10, Q is a bonding group and represents an alkylene group, an alkylene group which may contain an oxygen atom, an aromatic ring or a polycyclic aromatic ring, and Q may contain a fluorine atom) to the fluorinated polymer as defined in claim 1.

9. A vulcanizable fluorinated polymer composition obtainable by incorporating a quaternary onium salt and an acid scavenger to the fluorinated polymer as defined in claim 1.

10. A crosslinked rubber obtainable by crosslinking the fluorinated polymer as defined in claim 1.

11. A crosslinked rubber obtainable by crosslinking the fluorinated polymer composition as defined in claim 8.

12. A crosslinked rubber obtainable by crosslinking the fluorinated polymer composition as defined in claim 9.

13. A process for producing the fluorinated polymer as defined in claim 1, characterized by conducting radical copolymerization of an ethylenic unsaturated compound having a hydroxyphenyl group, at least one fluoromonomer selected from the group consisting of tetrafluoroethylene, hexafluoropropylene, vinylidene fluoride, 3,3,3-trifluoropropene, 1,3,3,3-tetrafluoropropene, 1,1,2-trifluoroethylene, vinyl fluoride, 1,2-difluoroethylene and $CF_2=CF-O-R^f$ (wherein $R^f$ is a $C_{1-8}$ saturated perfluoroalkyl group or a perfluoro(alkoxyalkyl) group), and if necessary, at least one hydrocarbon monomer selected from the group consisting of ethylene, propylene and $CH_2=CH-O-R^1$ (wherein $R^1$ is a $C_{1-8}$ saturated alkyl group or an alkoxyalkyl group) in the presence of a radical polymerization initiator.

* * * * *